3,117,134
DIOXASPIRODODECENES
George B. Steriing, Midland, and Chester E. Pawloski, Bay City, Mich., assignors to The Dow Chemical Company, Midland, Mich., a corporation of Delaware
No Drawing. Filed Mar. 5, 1962, Ser. No. 177,183
3 Claims. (Cl. 260—338)

The present invention is directed to dioxaspirododecenes corresponding to the formula:

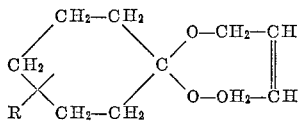

In this and succeeding formulae, R represents tertiary butyl or cyclohexyl. These compounds are liquid materials which are somewhat soluble in many common organic solvents and of low solubility in water. They are useful as parasiticides for the control of insects, worms and bacterial and fungal organisms such as ascarids and trichostrongylids. They are also useful in the manufacture of improved latex polymers and vinyl rubber products such as copolymers with butadiene. The latexes and vinyl rubber products are found to have very desirable and improved tensile, soft, lubricous and elastic properties.

The novel dioxaspirododecene compounds are prepared by reacting 2-butene-1,4-diol with a suitable dialkoxyalkane and a tertiary butyl cyclohexanone or cyclohexyl cyclohexanone. Suitable dialkoxyalkanes include 2,2-dimethoxybutane, 2,2-dibutoxypropane, 3,3-dimethoxypentane, 2-butoxy-2-methoxypropane, 1,1-diethoxyethane, dimethoxy cyclohexane, α,α-dimethoxytoluene and the like. The reaction is carried out in the presence of a small and catalytic amount of an acidic catalyst such as sulfuric acid, dichloroacetic acid, dichloropropionic acid, phosphoric acid, trichloroacetic acid and the like. Good results are obtained when employing substantially equimolecular proportions of the butenediol, aldehyde and dialkoxyalkane materials. Where optimum yields are desired, it is preferred to employ an excess of the aldehyde and dialkoxyalkane reagents. The reaction conveniently is carried out in an organic liquid as reaction medium and takes place readily at temperatures of from 10° to 100° C. In carrying out the reaction, the butenediol, aldehyde and dialkoxyalkane reagents are mixed together with a catalytic amount of the acid catalyst and the resulting mixture maintained for a short period in the reaction temperature range. Upon completion of the reaction, the reaction mixture is fractionally distilled under reduced pressure to obtain the desired product as a liquid residue.

The following examples merely illustrate the invention and are not to be construed as limiting.

*Example 1.—3-Cyclohexyl-7,12-Dioxaspiro(5.6)Dodec-9-ene*

2-butene-1,4-diol (88 grams; 1 mole), 110 grams (1 mole) of 2,2-dimethoxypropane and 198 grams (1 mole) of 4-cyclohexyl cyclohexanone were mixed together with stirring in 100 milliliters of benzene containing a few drops of concentrated sulfuric acid. During the stirring operation which was carried out at room temperature, a reaction took place with the formation of a single liquid phase. The reaction mixture was thereafter distilled at a 3:1 reflux ratio until the pot temperature reached 130° C. after which it was allowed to cool. A small amount of sodium carbonate was then added to the mixture and distillation completed under vacuum to obtain a 3-cyclohexyl-7,12-dioxaspiro(5.6)dodec-9-ene product as a liquid material. This product boiled at 152° C. at 1 millimeter pressure, and had a refractive index n/D of 1.5050 at 25° C. and carbon and hydrogen contents of 75.16 and 10.38 percent, respectively, as compared to theoretical contents of 76.8 and 10.4 percent.

*Example 2.—3-Tertiary Butyl-7,12-Dioxaspiro(5.6) Dodec-9-Ene*

2-butene-1,4-diol (1 mole), 1 mole of 2,2-dimethoxypropane, 168 grams (1 mole) of 4-tertiary butyl cyclohexanone, 200 milliliters of benzene and a few drops of concentrated sulfuric acid were mixed together with stirring at room temperature. During the stirring, a reaction took place resulting in the formation of a single liquid phase. The reaction mixture was thereafter fractionally distilled under reduced pressure to obtain a 3-tertiary butyl-7,12-dioxaspiro(5.6)dodec-9-ene product as a liquid residue boiling at 112° C. at 0.7 millimeter pressure, and having a refractive index n/D of 1.4825 at 25° C. and carbon and hydrogen contents of 73.94 and 10.5 percent, respectively, as compared to theoretical contents of 74.9 and 9.8 percent.

In exactly comparable operations, 2-cyclohexyl cyclohexanone, 3-cyclohexyl cyclohexanone, 2-tertiary butyl cyclohexanone and 3-tertiary butyl cyclohexanone are separately reacted with 2-butene-1,4-diol and 2,2-dimethoxypropane together with a catalytic amount of concentrated sulfuric acid to obtain the corresponding cyclohexyl and tertiary butyl substituted 7,12-dioxaspiro(5.6) dodec-9-ene compounds.

The new compounds of the present invention have been found to be useful as parasiticides and as constituents in latex polymers and vinyl rubber products. For parasiticidal use, the products are dispersed on a finely divided solid and employed as dusts. Also, such mixtures may be dispersed in water with the aid of a wetting agent and the resulting aqueous suspensions employed as sprays. In other procedures, the products are employed as constituents of solvent solutions, oil-in-water or water-in-oil emulsions or water dispersions with or without the addition of wetting, dispersing and emulsifying agents. In representative operations, 3-cyclohexyl-7,12-dioxaspiro(5.6) dodec-9-ene gives 100 percent kills of *Erwinia amylovora* at concentrations of 10 parts per million parts by weight. In other operations, 3-tertiary butyl-7,12-dioxaspiro(5.6) dodec-9-ene gives substantially complete controls of ascarids at dosages of 0.1 percent by weight of the treating composition.

What is claimed is:
1. A compound having the formula:

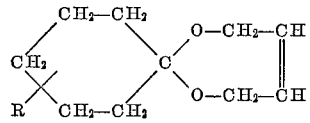

wherein R represents a member of the group consisting of tertiary butyl and cyclohexyl.
2. 3-cyclohexyl-7,12-dioxaspiro(5.6)dodec-9-ene.
3. 3-tertiary butyl-7,12-dioxaspiro(5.6)dodec-9-ene.

No references cited.